(Model.)
C. A. DODGE.
MILK STRAINER.
No. 347,581.      Patented Aug. 17, 1886.
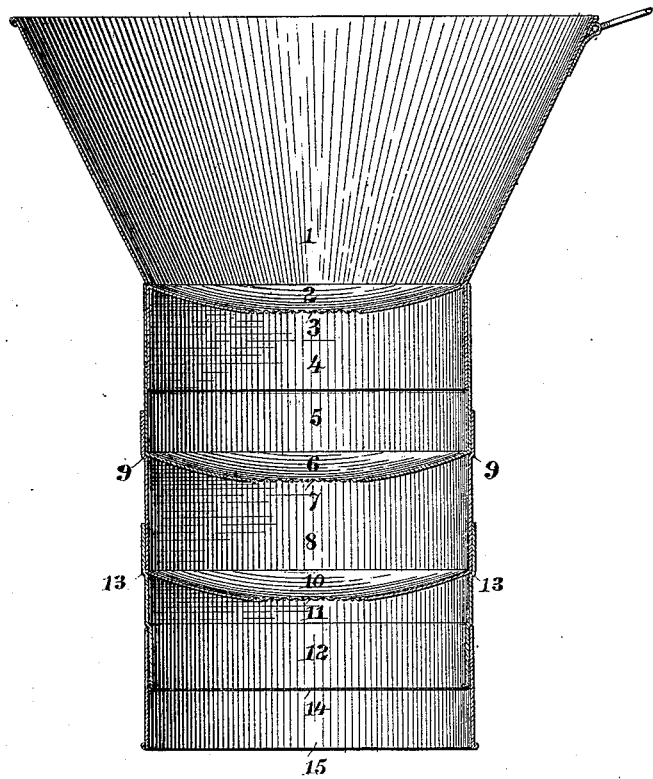
Attest:
Geo. T. Smallwood
F. A. Hopkins
Inventor:
Celinda A. Dodge.
By Knight Bros.
Attys.

UNITED STATES PATENT OFFICE.

CELINDA A. DODGE, OF KINNICKINNICK, WISCONSIN.

MILK-STRAINER.

SPECIFICATION forming part of Letters Patent No. 347,581, dated August 17, 1886.

Application filed April 8, 1886. Serial No. 198,275. (Model.)

*To all whom it may concern:*

Be it known that I, CELINDA A. DODGE, a citizen of the United States, residing at Kinnickinnick, in the county of St. Croix and State of Wisconsin, have invented a new and useful Improvement in Milk-Strainers, of which the following is a specification.

My improved milk-strainer has the usual funnel for receiving the milk, and arranged at the bottom of this funnel has a series of wire-gauze strainers of gradually-increasing fineness, each strainer supported in a separate cup, which may be slipped one on the other, so that any number may be used. Below the last wire-gauze strainer I may also employ a final strainer of cloth, which is held by inner and outer rings of metal, between which the edges of the cloth are pressed. The gauze strainers are arranged in a peculiar manner, being of small diameter and arranged in the center of the bottom of each member of the strainer, so that surrounding the gauze is a considerable surface of the tin or other metal.

I am aware that milk-strainers have been before devised in which a series of straining-cloths were placed one above the other and clamped between metal rings, and I am also aware that wire-gauze has been used in similar strainers.

My improvement consequently relates to certain details indicated above, and pointed out specifically in the claims.

In order that the invention may be fully understood, I will proceed to describe it with reference to the accompanying drawing, which represents my improved milk-strainer in vertical section.

The funnel 1 is provided with a bottom, 2, in the center of which is made a circular aperture, across which is soldered a wire-gauze diaphragm or strainer, 3. A flange, 4, extending from the bottom of the funnel 1, and surrounding the wire-gauze diaphragm 3 concentrically, is adapted to receive a metal cup, 5, which is slipped over it, and has a bottom, 6, in the center of which a wire-gauze strainer, 7, is arranged in similar manner to strainer 3 in the bottom of the funnel. The strainer 7 is made of finer gauze than the strainer 3. The upper end of the cup 5 may abut directly against the underside of the funnel 1. To prevent the cup 8, however, which is slipped over the outside of the cup 5, from passing too far, it is provided with a shoulder, 9, against which the bottom of the cup 5 abuts. The cup 8 is provided with a bottom, 10, having a still finer wire-gauze, 11, in its center. Milk poured into the funnel 1 will thus be passed through three successive strainers of increasing fineness, and, in addition, I may employ a ring, 12, having shoulder 13, and adapted to slip over the bottom cup, 8. A diaphragm, 14, of fine muslin or other suitable cloth, may be spread over the bottom of the ring 12, and be fixed by an outer ring, 15, pressed over the edges of the cloth.

I am aware that a milk-pail the cover of which has an aperture in its center covered with a wire-gauze strainer is not new; also, that a funnel the bottom flange of which receives a ring within it, which clamps a cloth strainer therein, such ring extending below the flange of the funnel and carrying upon the bottom another cloth strainer, clamped by means of a further ring placed over the first, is not new; also, that a series of rings with the openings covered with wire-gauze and secured together upon the end of a spout by means of a screw-threaded cap fitting over them is not new, and, also, that a filter made up of a number of sections, each section having in its bottom a number of tubes fixed in perforations in such bottom, and placed within such tubes wicks hanging over the tops thereof for drawing off the liquid, which passes through the same and drops into the section below, is not new. These constructions I do not claim; but,

Having thus described my invention, the following is what I claim as new therein and desire to secure by Letters Patent:

1. A milk-strainer consisting of a funnel, 1, having bottom 2, a wire-gauze strainer, 3, in the center of said bottom, a flange, 4, fixed to the bottom of the funnel and surrounding the wire-gauze 3 concentrically, and cups 5 8, having bottoms 6 10, with wire-gauze strainers formed of different degrees of fineness therein, all arranged substantially as and for the purpose set forth.

2. In a milk-strainer, in combination with a funnel, 1, having a wire-gauze diaphragm in its bottom, cups 5 8, adapted to be applied to the bottom of said funnel and carrying wire-gauze diaphragms of gradually-increasing fineness, a ring, 12, surrounding the lower cup and projecting below the same, cloth stretched over the lower edge of said ring, and a second ring, 15, adapted to be pressed over the ring 12 and clamp the edges of the cloth, substantially as and for the purpose set forth.

CELINDA A. DODGE.

Witnesses:
C. H. VAN SCHAICK,
A. W. KALER.